United States Patent [19]

Meschnig

[11] 4,232,497
[45] Nov. 11, 1980

[54] DEVICE FOR SECURING PLATELIKE ELEMENTS TO A CARRYING STRUCTURE AT A DISTANCE THEREFROM

[76] Inventor: Albin Meschnig, Müllnern 72 (Kärnten), A-9585 G dersdorf, Austria

[21] Appl. No.: 13,654

[22] Filed: Feb. 21, 1979

[51] Int. Cl.³ .......................... E04B 1/38; F16B 39/00
[52] U.S. Cl. .................................... 52/506; 151/41.7; 403/14
[58] Field of Search ............... 151/41.7, 41.76; 85/32 R; 403/21, 22, 116, 14; 52/506

[56] References Cited

U.S. PATENT DOCUMENTS

| 2,339,130 | 1/1944 | Albin | 151/41.76 |
| 2,820,499 | 1/1958 | Schaaf | 151/41.7 |
| 3,318,622 | 5/1967 | Crumpler | 151/41.75 |

*Primary Examiner*—James L. Ridgill, Jr.
*Attorney, Agent, or Firm*—Martin A. Farber

[57] ABSTRACT

A device for securing suspended platelike elements to a carrying structure, e.g., for securing suspended ceilings to an overlying floor, is proposed and comprises a carrier which is secured to the carrying structure and provided with a movable nut member and also comprises a cap screw or the like which is screwed into the nut member. The tapped bore in the nut member is automatically aligned with the crew.

7 Claims, 4 Drawing Figures

DEVICE FOR SECURING PLATELIKE ELEMENTS TO A CARRYING STRUCTURE AT A DISTANCE THEREFROM

FIELD OF THE INVENTION

This invention relates to a device for securing platelike elements to a carrying structure, particularly for securing suspended ceilings to an overlying structure, comprising at least one cap screw or the like, which is adapted to be pushed through a bore in the platelike element and to be screwed into a nut member secured to the carrying structure.

PRIOR ART

When, e.g., suspended ceilings are to be secured to an overlying floor, it is difficult to exactly coordinate the fixing openings of the platelike elements with the nuts secured to the overlying floor. This operation requires great experience and is expensive and time-consuming because exact measurements are required at the overlying floor and the platelike elements.

OBJECT

It is an object of the invention to provide a device which is of the kind described first hereinbefore and enables a fixation of platelike elements even when the fixing holes in the platelike elements and the fixing means on the overlying structure are no longer exactly in registry.

SUMMARY OF THE INVENTION

This object is accomplished according to the invention in that a carrier is secured to the carrying structure and the nut member is mounted in said carrier to be pivotally movable and to be held against an unlimited rotation about the axis of the tapped bore and that the cap screw is provided at its tip with a substantially cylindrical extension, which has a diameter that is smaller than the inside diameter of the tapped bore. Because the nut member is pivoted, the direction of the tapped bore can be adjusted as desired so that it is directed to the corresponding bore in the platelike element and the cap screw can readily be screwed into the nut member. The threadless extension provided on the cap screw or the like readily permits the nut member to be pivotally moved as far as is required in that the threadless extension is simply forced into the tapped bore.

This aligning of the nut member with the aid of the extension will be particularly simple if the extension is at least as long as the tapped bore. Within the scope of the invention, the free end of the extension may be crowned or conical.

To permit the free end of the extension to be easily inserted into the tapped bore, the latter may have an outwardly flaring, conical entrance opening.

Within the scope of the invention it has proved desirable to provide the carrier with a guide member for the cap screw, which guide member is formed with a preferably frustoconical opening, which tapers towards the nut member. In that embodiment the guide member also closes the carrier at its bottom so that the nut member cannot fall out of the carrier.

To prevent a rotation of the nut member to such an extent that the cap screw can no longer be inserted into the tapped bore, the nut member in one embodiment of the invention is substantially part-spherical and at least one pin is inserted in the nut member and is a clearance fit in an aperture of the carrier.

In the device according to the invention, a desired range of the pivotal movement of the nut member may be defined by the selection of the size of the aperture in the carrier and of the diameter of the pin.

In a particularly satisfactory embodiment, the pin lies in that equatorial plane of the nut member which is at right angles to the axis of the tapped bore.

Also within the scope of the invention, the carrier may consist of a hollow-cylindrical member, which is circular in cross-section and has a shell formed with the aperture.

Also within the scope of the invention, the pin may be a longitudinally slit spring sleeve. The device according to this embodiment of the invention can be manufactured in a particularly simple manner because when the nut member has been inserted into the carrier the pins can be driven through the apertures into the nut member.

Whereas one pin is sufficient for the desired purpose, a plurality of pins, preferably three thereof, may be provided within the scope of the invention and may be regularly spaced around the nut member, and the carrier may be provided with a corresponding number of apertures. This design will increase the safety with which an undesired rotation of the nut member about the axis of the tapped bore is prevented.

SHORT DESCRIPTION OF THE DRAWING

Further details of the invention will now be explained more fully with reference to an illustrative embodiment which is diagrammatically shown on the accompanying drawing, in which.

DETAILED DESCRIPTION

Figure 2:
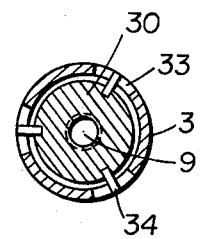
FIG. 2 is a section taken along the lines 2—2 of FIG. 1.

By means of a connector 2 and screws, not shown, which extend through bores 36 of the connector, a carrier 3 is secured to an overlying floor, not shown. The carrier 3 carries at its lower end a guide member 31, which contains a preferably frustoconical opening 32, which tapers towards the carrier 3.

In the embodiment shown by way of example the carrier 3 is connected to the connector 2 and the guide member 31 by respective seam welds 37 and 38, although joints of any other types, such as screwed or adhesive joints, may be adopted.

The carrier 3 may consist, e.g., of a tube which is circular in cross-section and contains a nut member 30, which is substantially part-spherical and which is a clearance fit in the interior of the carrier 3. The nut member 30 has a tapped bore 9. At one end, which faces the guide member 31 and the entrance opening 32 thereof, the tapped bore 9 flares like a funnel to form an entrance opening 10. The connector 2 contains a bore 35, through which the tip 15 of a screw 13 to be screwed into the nut member 30 may extend.

Figure 3:
FIG. 3 is a perspective view of a longitudinally slit spring sleeve.

The nut member 30 contains one inserted pin 34, which lies in that equatorial plane of the nut member 30 that is at right angles to the axis of the tapped bore 9. Whereas only one pin 34 is shown on the drawing, a plurality of such pins, preferably three thereof regularly spaced around the nut member, may be provided (FIG. 2). It will be understood that the corresponding number of apertures 33 will then be provided in the carrier. The pin 34 consists preferably of a longitudinally slit spring sleeve 34' (FIG. 3) so that when the nut member 30 has been inserted into the carrier 3 the pin 34 can readily be driven into the nut member 30.

Figure 1:
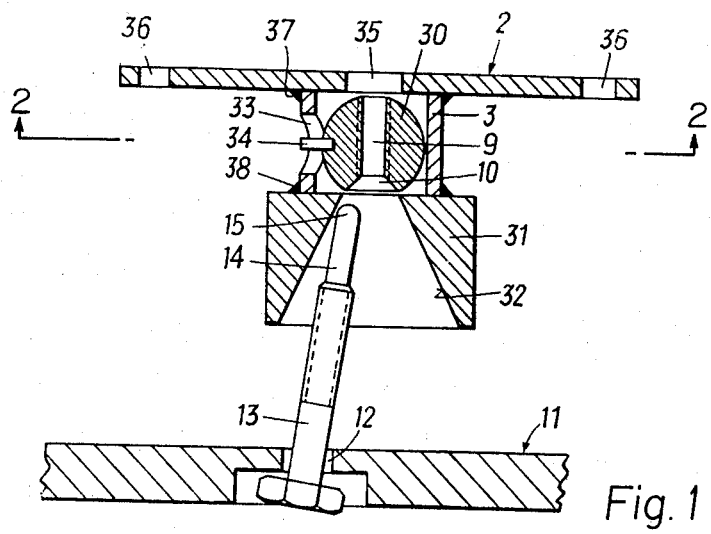
FIG. 1 is a sectional elevational view of the assembly for securing panels.
Figure 4:
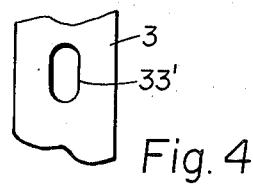
FIG. 4 is a broken away elevational view showing a form of the aperture as a slot parallel to the axis of the carrier.

The aperture or apertures 33 may have various shapes. For instance, it or they may consist of slots 33' which are parallel to the axis of the carrier 3 (FIG. 4), of may be substantially circular (FIG. 1).

The rotation of the nut member 30 about the axis of the tapped bore 9 is limited by the engagement of the pin or pins 34 with the side edges of the aperture or apertures 33. It is also apparent from the drawing that the nut member 30 can be pivotally moved only until the pin 34 engages the upper or lower edge of the aperture 33.

When a platelike element 11 is to be secured by means of the device according to the invention, the cap screw 13 is pushed through a bore 12 in the platelike element 11. The cap screw 13 has at its tip a threadless extension 14, the forward end 15 of which may be crowned or conical. As the cap screw 13 is pushed upwardly, its tip is guided in the frustoconical opening 32 in the guide member 31 to the entrance opening 10 of the tapped bore and as the cap screw is pushed up further the nut member 30 is so adjusted that the axis of the tapped bore 9 is parallel to the axis of the cap screw. The cap screw 13 can now readily be screwed into the nut member 30.

I claim:

1. An assembly for securing a panel to a carrying structure, particularly for securing suspended ceilings to an overlying structure, comprising
    a carrier means for attachment to a carrying structure, said carrier means being formed with a plurality of apertures,
    a nut member pivotally mounted in the carrier means, said nut member being formed with a threaded tapped bore,
    a bolt adapted to be passed through an opening in the panel and screwed into the tapped bore of the nut member, the bolt having a cylindrical extension of a diameter smaller than the threaded tapped bore of the nut member and the carrier means having a flared guide means for leading said cylindrical extension into the nut member,
    a plurality of pins extending from the nut member constituting means for restricting rotation of the nut member about the axis of said threaded tapped bore,
    the pins having a clearance fit in said apertures, respectively, in the carrier means are regularly spaced around the nut member, said apertures in said carrier means correspond to the number of said pins.

2. An assembly for securing a panel to a carrying structure, particularly for securing suspended ceilings to an overlying structure, comprising
    a carrier means for attachment to a carrying structure, said carrier means being formed with at least one aperture,
    a nut member pivotally mounted in the carrier means, said nut member being formed with a threaded tapped bore,
    a bolt adapted to be passed through an opening in the panel and screwed into the tapped bore of the nut member, the bolt having a cylindrical extension of a diameter smaller than the threaded tapped bore of the nut member and the carrier means having a flared guide means for leading said cylindrical extension into the nut member,
    at least one pin extending from the nut member constituting means for restricting rotation of the nut member about the axis of said threaded tapped bore,
    the pin having a clearance fit in said aperture in the carrier means,
    the aperture in the carrier means consists of a slot which is parallel to the axis of the carrier means.

3. The device as set forth in claim 1, wherein the nut member is formed with an entrance opening communicating with said tapped bore and flares outwardly communicating substantially continuously with said flared guide means.

4. An assembly for securing a panel to a carrying structure, particularly for securing suspended ceilings to an overlying structure, comprising
    a carrier means for attachment to a carrying structure, said carrier means being formed with at least one aperture,
    a nut member pivotally mounted in the carrier means, said nut member being formed with a threaded tapped bore,
    a bolt adapted to be passed through an opening in the panel and screwed into the tapped bore of the nut member, the bolt having a cylindrical extension of a diameter smaller than the threaded tapped bore of the nut member and the carrier means having a flared guide means for leading said cylindrical extension into the nut member,
    at least one pin extending from the nut member, constituting means for restricting rotation of the nut member about the axis of said threaded tapped bore,
    the pin having a clearance fit in said aperture in the carrier means,
    the aperture in the carrier means is substantially circular.

5. The device according to claims 1, 2 or 4, wherein the carrier means comprises a hollow-cylindrical member circular in cross-section with open ends and has a shell formed with said aperture(s).

6. The device according to claims 1, 2, or 4 wherein said pin(s) lies in that equatorial plane of the nut member which is at right angles to the axis of the tapped bore.

7. A device according to any of the claims 1, 2 or 4 wherein
    said pin(s) is a longitudinally slit spring sleeve.

* * * * *

UNITED STATES PATENT AND TRADEMARK OFFICE
CERTIFICATE OF CORRECTION

PATENT NO. : 4,232,497
DATED : November 11, 1980
INVENTOR(S) : Albin Meschnig

It is certified that error appears in the above—identified patent and that said Letters Patent are hereby corrected as shown below:

Item [76]  "G dersdorf," should read --Gödersdorf--

Signed and Sealed this

Seventeenth Day of March 1981

[SEAL]

Attest:

RENE D. TEGTMEYER

Attesting Officer     Acting Commissioner of Patents and Trademarks